United States Patent [19]

Lejeune et al.

[11] Patent Number: 4,795,881

[45] Date of Patent: Jan. 3, 1989

[54] CURVED ELECTRICAL COMPONENTS AND LASER TRIMMING THEREOF

[75] Inventors: Bernard E. Lejeune; Philippe G. Lejeune, both of Les Granges le Roi, France

[73] Assignee: Teradyne, Inc., Boston, Mass.

[21] Appl. No.: 57,334

[22] Filed: Jun. 2, 1987

[51] Int. Cl.⁴ .............................................. B23K 26/00
[52] U.S. Cl. ........................... 219/121.69; 219/121.74; 219/121.72
[58] Field of Search ................. 219/121 LH, 121 LJ; 338/195

[56] References Cited

U.S. PATENT DOCUMENTS

| | | | |
|---|---|---|---|
| 4,154,530 | 5/1979 | Connolly, Jr. et al. | 219/121 LH X |
| 4,182,024 | 1/1980 | Cometta | 219/121 LH X |
| 4,184,062 | 1/1980 | Schmidt | 219/121 LH |
| 4,580,030 | 4/1986 | Takeuchi | 338/195 X |

*Primary Examiner*—C. L. Albritton

[57] ABSTRACT

A laser trimmed electrical component including a substrate, and material supported on the substrate, the material having two ends and a curved portion therebewteen defined by inner and outer curved boundaries, the material having a laser cut that enters the material at one boundary in a first leg, has a curved second leg that is between and follows the inner and outer boundaries, and leaves the material at the same boundary in a third leg.

7 Claims, 7 Drawing Sheets

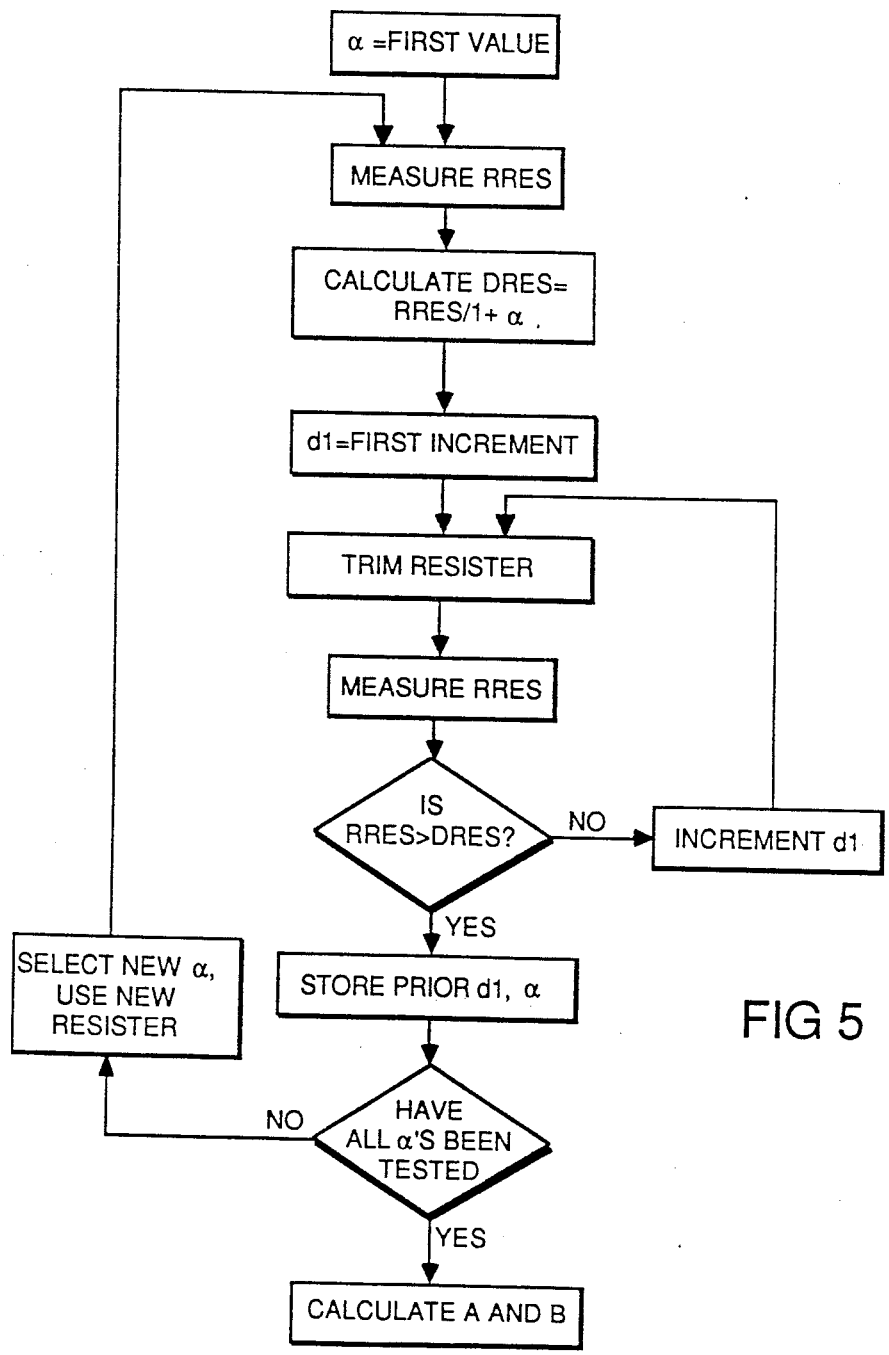

METHOD OF HIGH ACCURACY TRIMMING

CURVED ELECTRICAL COMPONENTS AND LASER TRIMMING THEREOF

FIELD OF THE INVENTION

The invention relates to laser trimming of electrical components.

BACKGROUND OF THE INVENTION

Resistors made of resistor material supported on a substrate and having electrodes at two ends of the material are trimmed by lasers to precisely remove material between the electrodes so as to achieve the desired resistance for the resistor. By removing material, the flow of electricity is impeded, thereby increasing resistance.

Fixed resistance resistors typically have rectangular patches of resistor material on the substrate, and trimming of these rectangular resistors has typically involed a plunge cut (a single slice extending from one side into the material transverse to the direction between electrodes), an L-cut (two legs, one extending in from a side transverse to the direction between electrodes and one parallel to the direction), a U-cut (three legs, two extending from a side and transverse to the direction and one parallel to it), or a scan cut (repetitive overlapping cuts that remove a large portion of material).

Potentiometers have been made using curved patches of resistor material having inner and outer boundaries that are concentric arcs; the material is connected in the circuit by a fixed electrode at one end and a rotatable contact that can be moved to contact the resistor material at various positions along its curved length. Such curved resistors are typically trimmed by making a plurality of plunge cuts extending radially from the inner curved boundary and spaced from each other along the curved patch of resistor material.

SUMMARY OF THE INVENTION

It has been discovered that electronic components made of material supported on a substrate and defined by curved inner and outer boundaries could be desirably trimmed by a cut that enters the material at one boundary in a first leg, has a curved second leg that is between and follows the inner and outer boundaries, and leaves the material at the same boundary in a third leg. The microcracks and disruption to electron flow caused by termination of plunge cuts within the material is avoided.

In preferred embodiments the inner and outer boundaries of the resistor material are concentric arcs; the second leg changes in radius so as to achieve desired (e.g., linear) resistance around the material; the resistance of the material is measured prior to trimming, and the length of the first leg is a function of the resistance; the value of the length of the leg is determined by reference to information based upon cuts of legs of different lengths of a component of the same geometry as the component being trimmed; and there is a second cut that overlaps the first, and resistance is measured during cutting of the second leg of the second cut, which ends when desired resistance has been achieved.

Other features and advantages of the invention will be apparent from the following description of the preferred embodiment thereof and from the claims.

DESCRIPTION OF THE PREFERRED EMBODIMENT

The preferred embodiment will now be described.

Drawings

FIG. 5 is a flow diagram describing the method employed to obtain coefficients describing the FIG. 4 function.

STRUCTURE

Figure 1:
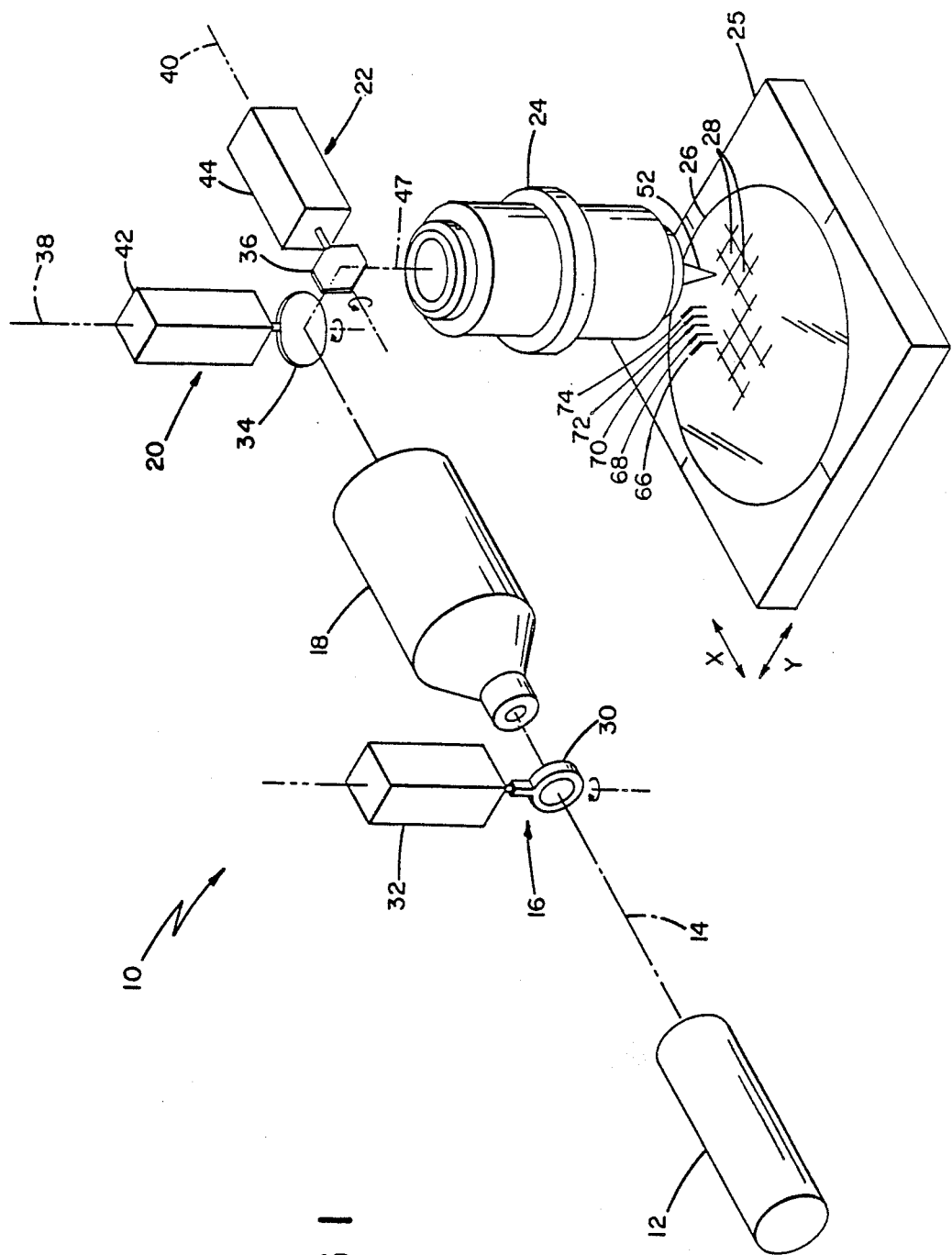
FIG. 1 is a diagrammatic perspective view of laser trimming apparatus according to the invention.
Figure 3:
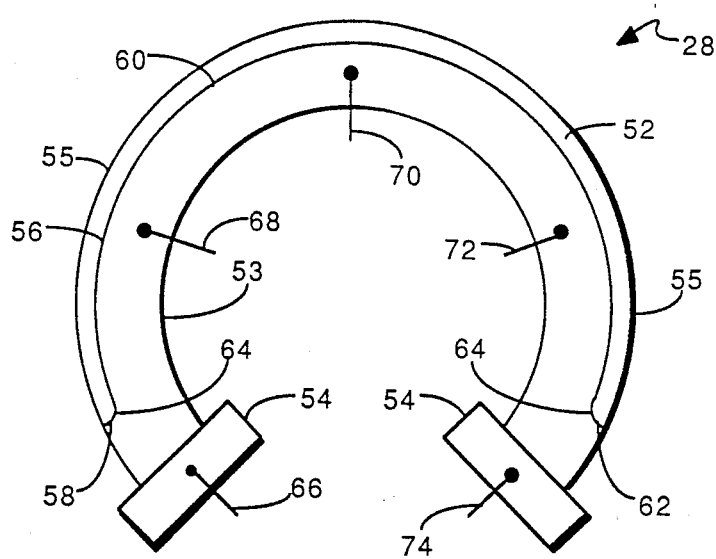
FIG. 3 is a diagrammatic plan view of a resistor trimmed according to the invention.

Referring to FIG. 1, there is shown laser trimming apparatus 10, the structure and operation of which is discussed in detail in U.S. Ser. No. 798,584, filed Nov. 15, 1985, entitled "Light Beam Positioning Apparatus", which is hereby incorporated by reference. Apparatus 10 includes neodymium YAG laser source 12 providing 1.06 micron beam 14, beam translator 16, beam expanding telescope 18, X-axis pivotal reflector 20, Y-axis pivotal reflector 22, telecentric scanning lens 24, and movable support 25 carrying substrate 26 carrying resistors 28 (FIG. 3). Beam translator 16 includes optically flat refracting element 30 (a flat piece of glass) pivotally mounted on galvanometer 32. Pivotal reflectors 20, 22 include mirrors 34, 36 mounted for pivoting about axes 38, 40 on galvanometers 42, 44 respectively. Apparatus 10 also includes probes 66, 68, 70, 72, 74, which are movably mounted (by means not shown) to contact electrodes 54 at three spaced locations along a curved patch of resistor material 52 (FIG. 3) of a resistor 28 to measure resistance.

Figure 2:
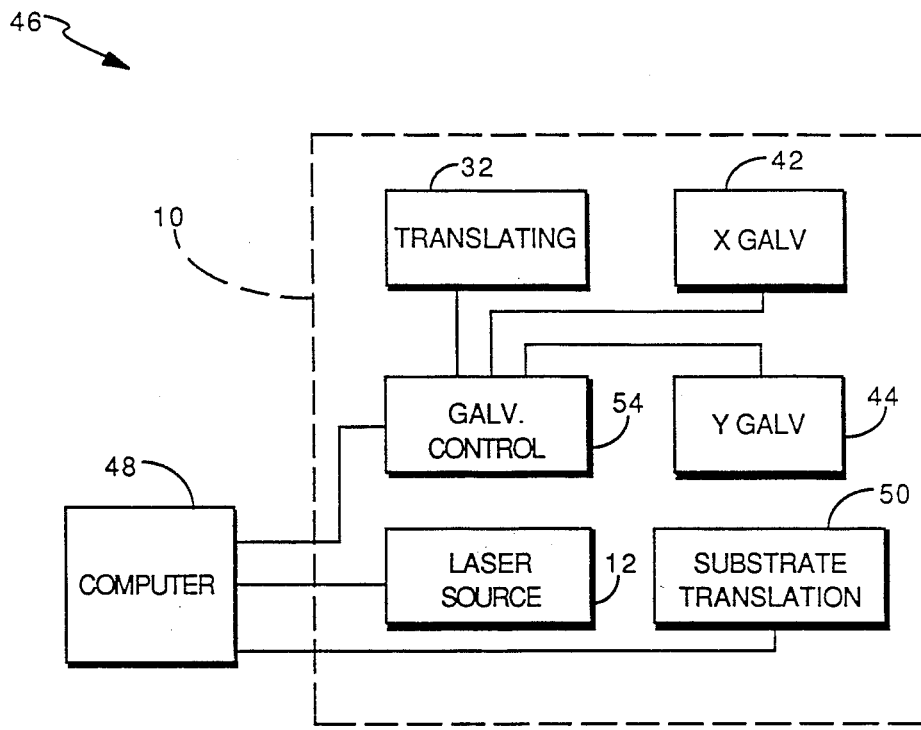
FIG. 2 is a block diagram of control components of the FIG. 1 laser trimming apparatus.

Referring to the simplified block diagram of FIG. 2 it is seen that trimming system 46 incorporating laser trimming apparatus 10 is controlled by external computer 48 and includes substrate translation mechanism 50, to make large movements of substrate 26 so that individual resistors 28 are moved into position for scanning by focused laser beam 52 (FIG. 1). Galvanometer control circuit 54 converts digital control signals into analog position signals for galvanometers 32, 42, 44.

Figure 3A:
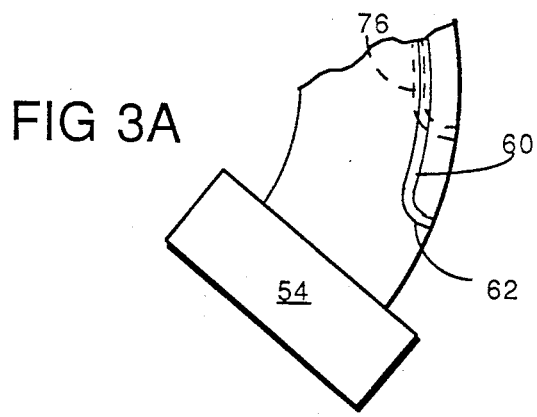
FIG. 3A is a partial diagrammatic plan view illustrating a high accuracy method of trimming a resistor according to the invention.

Referring to FIG. 3, it is seen that a resistor 28 includes resistor material 52, connected to electrodes 54 at its ends and having inner and outer boundaries 53, 55 defined by concentric arcs. Resistor material 52 has a first laser cut 56 in it made according to the invention. First cut 56 has radial first leg 58 (which enters material 52 at outer boundary 55), curved second leg 60 (which is between and follows inner and outer boundaries 53, 55), radial third leg 62 (which leaves material 52 at outer boundary 53), and curved transitions or corners 64 between them. First leg 58 has a length of d1. Referring to FIG. 3A, overlapping second laser cut 76, ending before third leg 62 of first cut 56, is shown in phantom.

Operation

In general, after an initial characterization procedure, in which a data base is generated by trimming resistors 28 and measuring resulting resistance changes (as described in detail below), individual resistors 28 are trimmed by measuring initial resistance, PRES, and trimming so as to achieve desired resistance, DRES, which is higher then PRES.

In operation, a substrate 26 carrying resistors 28 to be trimmed by exposure to focused laser beam 52 is mounted on support 25. Substrate translation mechanism 50 moves individual resistors 28 on support 25 into alignment with telecentric scanning lens 24, and galvanometers 32, 42, 44 are used to quickly and accurately direct focused beam 52 to the particular resistor 28 being trimmed.

Galvanometer 42 pivots mirror 34 so that focused beam 52 moves in the X direction on wafer 26, and galvanometer 44 pivots mirror 36 so that focused beam 52 moves in the Y direction, all under control of computer 48. Depending on the pivotal position of mirror 34, galvanometer 32 adjusts refracting element 30 to laterally translate beam 14 the amount necessary so that it is reflected from mirror 34 to the center point 56 of pupil 45, as described in detail in the above-reference patent application.

A parameter used both in creating the data base and in the trimming operation is PRETEST, which is defined as the percentage difference between the measured resistance value, PRES, and the desired value, DRES, and is given by the following formula:

$$\text{PRETEST} = \frac{RRES - DRES}{DRES} \times 100$$

(Pretest thus is always negative for laser trimming.)

Figure 4:
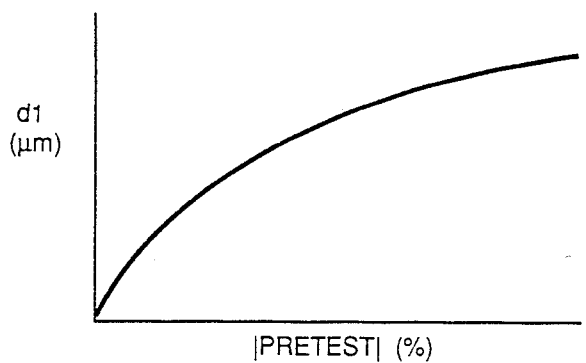
FIG. 4 is a graph of the length of cut (d1) versus PRETEST function determined by and employed in controlling trimming by the FIG. 1 apparatus.

In the first step, the formula that describes the d1 versus PRETEST function shown in FIG. 4 is generated by determining the d1 values that result in the following PRETEST values, designated $\alpha$: $-3\%$, $-8\%$, $-13\%$, $-18\%$, $-23\%$, $-28\%$, $-33\%$, $-38\%$.

Referring to FIG. 5, a different resistor is used for each value of $\alpha$. Probes 66, 74 contact electrodes 54 of a resistor 28 to be trimmed, and its resistance, PRES, is measured. DRES is determined by the following formula:

$$DRES = \frac{RRES}{1 + \alpha}$$

This DRES value gives the final resistance value (after trimming a three-legged cut) associated with $\alpha$, given PRES. Resistor 28 is initially trimmed at the smallest step of d1 permitted by the apparatus, and the resulting resistance, PRES, is measured and compared with DRES. In this cut, the laser beam enters resistor material 52 at boundary 55 and cuts the three legs 58, 60, 62 of cut 56, as shown in FIG. 3, first and third legs 58, 62 having length of d1, and second leg 60 having constant radius, following inner and outer boundaries 53, 55. This continues, d1 being incremented by a step with each successive cut, until PRES is greater than DRES. The d1 just prior to that cut is the largest cut that can be achieved, keeping the resistor value smaller than the value expected. That d1 value provides a pair of data for the d1 versus PRETEST function of FIG. 4.

A new resistor 28 (having the same geometry) is then used for the next $\alpha$ value and so on until all $\alpha$'s have been used. The resulting eight-data data base, containing d1 values for each $\alpha$, is then used to generate coefficients A and B in the following polynominal approximation of the d1 versus PRETEST function:

$$d1 = A|PRETEST|^B$$

In particular, linear regression of log d1 versus log A plus B times log |PRETEST| is used with the eight data base values to obtain A and B.

The A, B coefficients just calculated are constants that will not be updated during a job involving the same geometry resistor material 52 and DRES.

Figure 6:
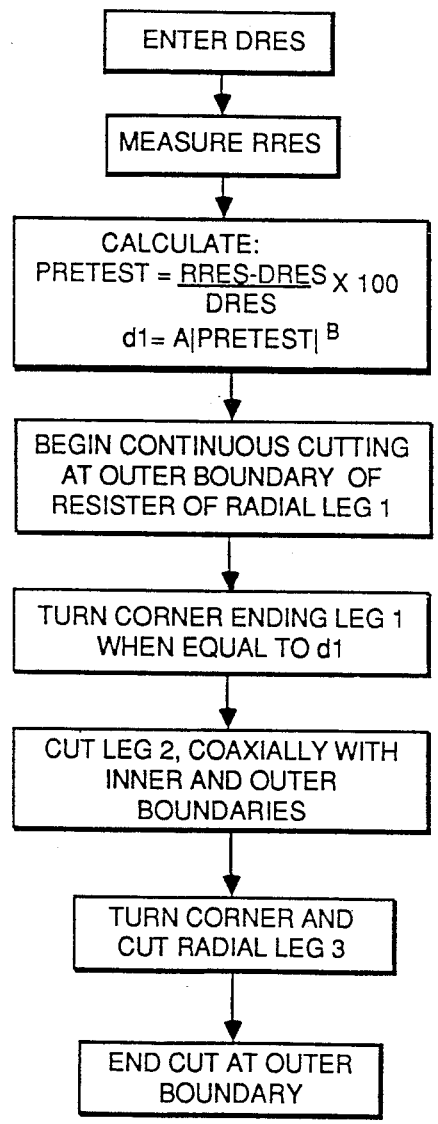
FIG. 6 is a flow diagram describing a method of trimming using the FIG. 1 apparatus.

Referring to FIG. 6, during actual trimming, as apparatus 46 trims individual resistors 28, it measures initial resistance PRES, employs A, B to determined d1, and continuously cuts cut 56 without stopping. First leg 58 is cut for a distance of d1. Second leg 60 is then cut coaxially with inner and outer boundaries 53, 55 and at constant radius for the desired distance, and third leg 62 is cut for the same distance as d1.

Single cut trimming, as just described, results in precision of $\pm 1.5\%$.

Figure 7:
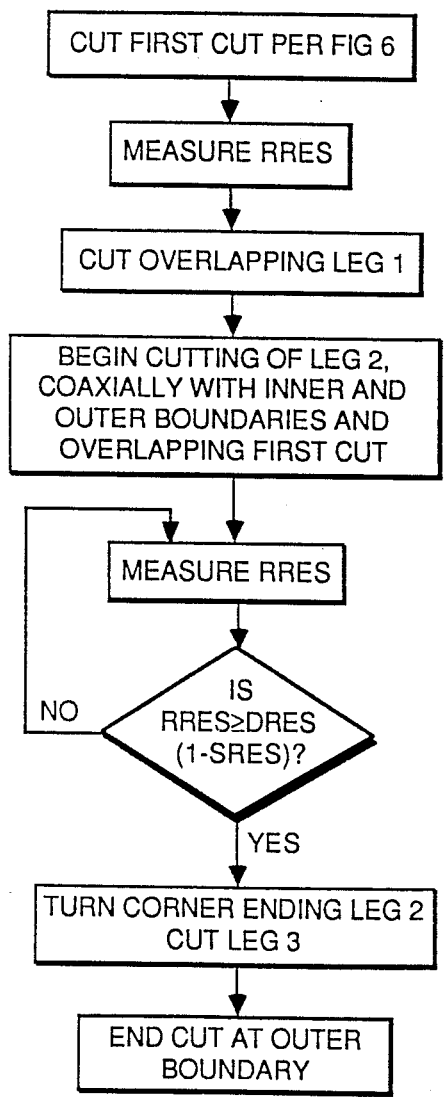
FIG. 7 is a flow diagram illustratiang a two-cut, high-accuracy trimming method.

A trimming method involving two cuts is illustrated in FIG. 3A and described in FIG. 7, and can be used to obtain accuracy of $\pm 0.3\%$. In it a first cut 56 is made the same as in FIG. 6, except that the DRES valued used in determining d1 is reduced by about 2% to guarantee that the resistance resulting after the first cut is not greater than DRES. A second cut 76 that overlaps cut 56 is then started, and resistance, PRES, is continuously measured and compared to DRES during the second leg. When PRES reaches DRES, the second leg is ended, resulting in a final resistance of DRES$\pm 0.3\%$. The beam diameter, and resulting kerf, is about 50 microns, and the amount of overlap by second cut 76 is, e.g., about 5–10 microns.

Figure 8:
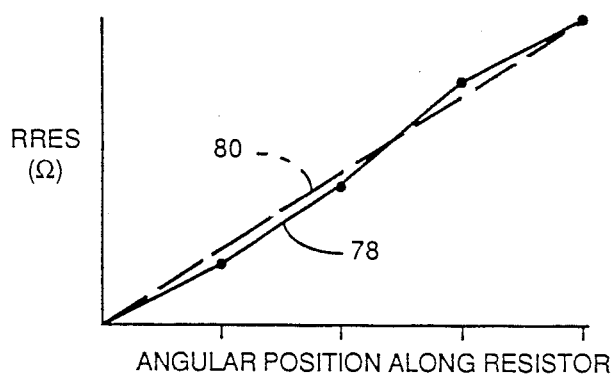
FIG. 8 is a graph of resistance versus position along a curved resistor.

A trimming method in which the radius of the second leg is varied to adjust for variation in resistance along resistor material 52 is illustrated and described in FIG. 8. On FIG. 8 the resistance between electrode 66 and electrode 68 is plotted as the first data point; the resistance between electrode 66 and electrode 70 is plotted as the second data point, and so on. The data points are connected by solid lines 78. The final data point (resistance between electrodes 66, 74) is connected to the origin by dashed line 80. Prior to trimming, resistance in four portions of material 52 is measured using probes 66, 68, 70, 72, 74, as is plotted on FIG. 8. In cutting second leg 60, the radius is varied to adjust for differences in resistance; e.g., the radius is increased at portions corresponding to where solid line 78 is above dashed line 80, and the radius is decreased where the solid line of FIG. 8 is below dashed line 80.

Other Embodiments

Other embodiments of the invention are within the scope of the following claims. E.g., the invention could be employed with electrical components other than resistors and in trimming to achieve electrical characteristics other than resistance (e.g., voltage, frequency, or some other characteristic dependent upon trimming). Also, instead of the three galvanometer/telecentric scanning lens system described above, a two galvanometer/nonelectric scanning system could be used.

What is claimed is:

1. A method of laser trimming an electrical resistor component comprising
providing material supported on a substrate, said material having two ends and a curved portion therebetween defined by inner and outer curved boundaries,
measuring resistance of said material, and
cutting said material by a cut that enters said material at one said boundary in a first leg, has a curved second leg that is between and follows said inner and outer boundaries, and leaves said material at the same said boundary in a third leg,
the length of said first leg being a function of said measured resistance, said length being selected to achieve desired resistance,
the value of the length of said first leg of said cut being determined by reference to information based upon cuts of legs of different lengths of a component of the same geometry as the component being trimmed.

2. The method of claim 1 wherein said cutting is continuous cutting.

3. The method of claim 1 wherein said information is the length of said leg as a function of PRETEST.

4. The method of claim 3 wherein said information is in the form of length equals $A|\text{PRETEST}|^B$, wherein A and B are constants determined by cuts associated with selected PRETEST values and forced DRES values.

5. The method of claim 1 wherein said inner and outer boundaries are concentric arcs.

6. The method of claim 5 wherein there is a second cut that overlaps the first cut, and during said cutting of a second leg of said second cut resistance is measured, and the second leg of the second cut ends after desired resistance has been achieved.

7. The method of claim 5 wherein said measuring said resistance includes measuring said resistance at different portions along said material, and wherein the radius of said second leg is varied during said cutting to adjust for differences in resistance at said different portions.

* * * * *

UNITED STATES PATENT AND TRADEMARK OFFICE
CERTIFICATE OF CORRECTION

PATENT NO.  : 4,795,881
DATED       : January 3, 1989
INVENTOR(S) : Bernard E. Lejeune It is certified that error appears in the above-identified patent and that said Letters Patent is hereby corrected as shown below:

Title page:

In the abstract, line 3-4, "therebwteen" should be --therebetween--;

Column 1, line 20, "involed" should be --involved--;

Column 2, line 24 "illustratiang" should be --illustrating--'

Column 3, lines, 10, 12, 34, 48, 57, 59, and 66, "PRES" should be --RRES--;

Column 4, line 7, "polynominal" should be --polynomial--;

Column 4, line 20, "PRES" should be --RRES--;

Column 4, line 20 "determined" should be --determine--;

Column 4, line 35 "PRES" should be --RRES--;

Column 4, line 37 "PRES" should be --RRES--;  and
Column 5, line 2, "nonelectric" should be --nontelecentric--.

Signed and Sealed this

Thirtieth Day of May, 1989

*Attest:*

DONALD J. QUIGG

*Attesting Officer*   *Commissioner of Patents and Trademarks*